Patented June 16, 1953

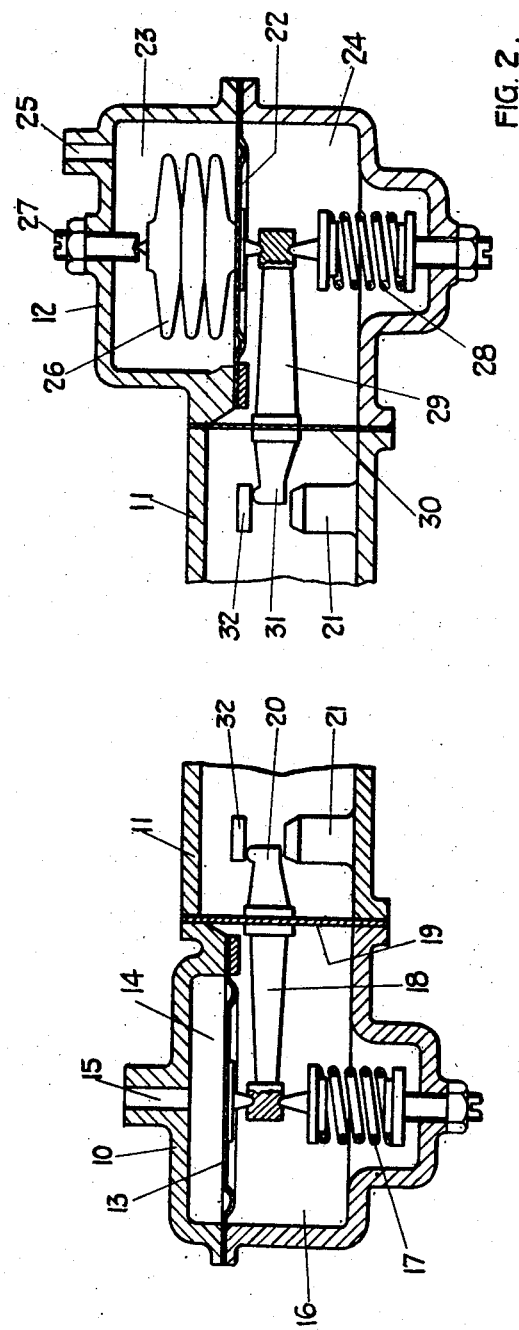

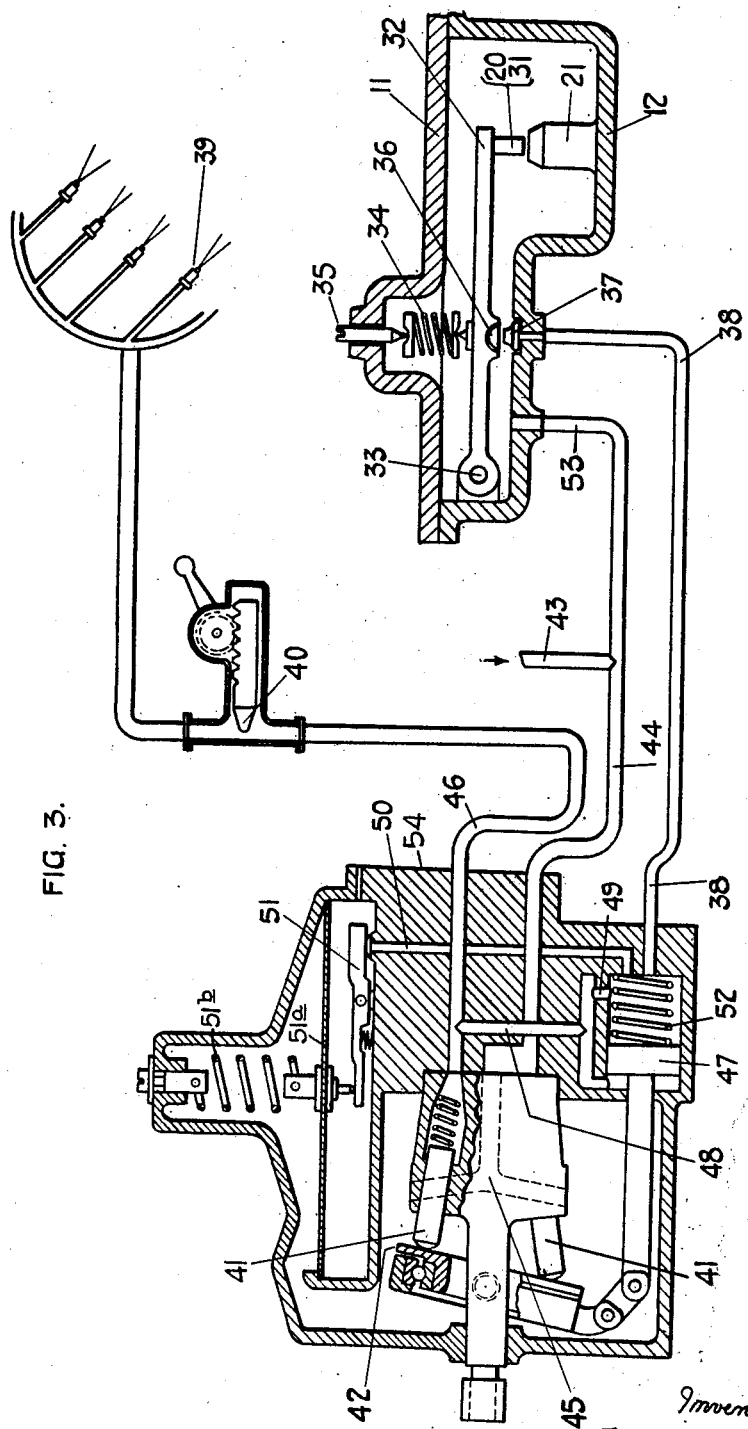

2,642,237

UNITED STATES PATENT OFFICE 2,642,237

AUTOMATIC FUEL FEED CONTROL SYSTEM FOR AIRCRAFT POWER PLANTS

Frederick William Page, Preston, and Stanley George Hooker, Derby, England; said Page assignor to The English Electric Company Limited, London, England, a British company, and said Hooker assignor to Rolls-Royce Limited, Derby, England, a British company Application March 17, 1947, Serial No. 735,270 In Great Britain January 14, 1946

5 Claims. (Cl. 244—53)

This invention relates to control systems for the indicated airspeed of self-propelled aircraft, and to aircraft provided with such control systems.

The strength and stiffness of the structure to which an aircraft must be designed, is determined in some degree by the maximum indicated airspeed it can attain, since many of the loads on the structure are functions of the square of the indicated air-speed. By the indicated air-speed is meant the speed as measured by a device responsive to the difference between the Pitot-pressure and the static pressure, that is to say to the dynamic pressure to which the aircraft is subjected in flight.

At high altitudes, the true air-speed of an aircraft is very much higher than the indicated airspeed, owing to the reduction in the density of the air, and since the indicated air-speed for maximum power output of the propelling plant is a maximum at ground level, the strength and stiffness, and therefore the weight, of the aircraft must be greater than is necessary to enable it to fly safely at a designated speed at a high altitude, or conversely, the power-output of the propelling plant must be limited, with the result that for a given strength and stiffness the aircraft will not attain its maximum safe speed at high altitude, and the performance at high altitude is correspondingly deleteriously affected.

It is an object of this invention to provide means for preventing an aircraft from attaining a dangerous indicated airspeed under any conditions of powered level flight.

According to the present invention there is provided means for limiting the maximum indicated air-speed of an aircraft in powered level flight, comprising a device responsive to a desired function of Pitot pressure and static air pressure and operative to reduce or limit the fuel supply to the power-plant when the said function attains a predetermined value.

According to an embodiment of the invention, the device aforesaid is responsive to the difference between the Pitot-pressure and the static air pressure and operates to reduce the supply of fuel to a jet propulsion or gas turbine power plant of the aircraft when the said pressure-difference attains a predetermined value.

According to another embodiment of the invention, the device aforesaid is responsive to the Mach number and operates to reduce the supply of fuel to the power plant of the aircraft when the said Mach number exceeds a predetermined value. By the Mach number is meant the ratio between the true air speed and the speed of sound under the prevailing atmospheric conditions.

Other features of the invention will be hereinafter described with relation to the accompanying drawings, and the novel details set out in the claims appended to this specification.

In the accompanying drawings, showing typical embodiments of the invention,

Figure 1 is a diagrammatic sectional view showing a portion of an apparatus which is responsive to the indicated air-speed, or difference between the Pitot-pressure and static pressure;

Figure 2 is a similar view showing a portion of a similar apparatus responsive to the Mach number, and Figure 3 is a diagrammatic view showing one arrangement for the control of the fuel-supply to a jet-engine, by combination with the devices illustrated in Figures 1 and 2.

Figure 4:
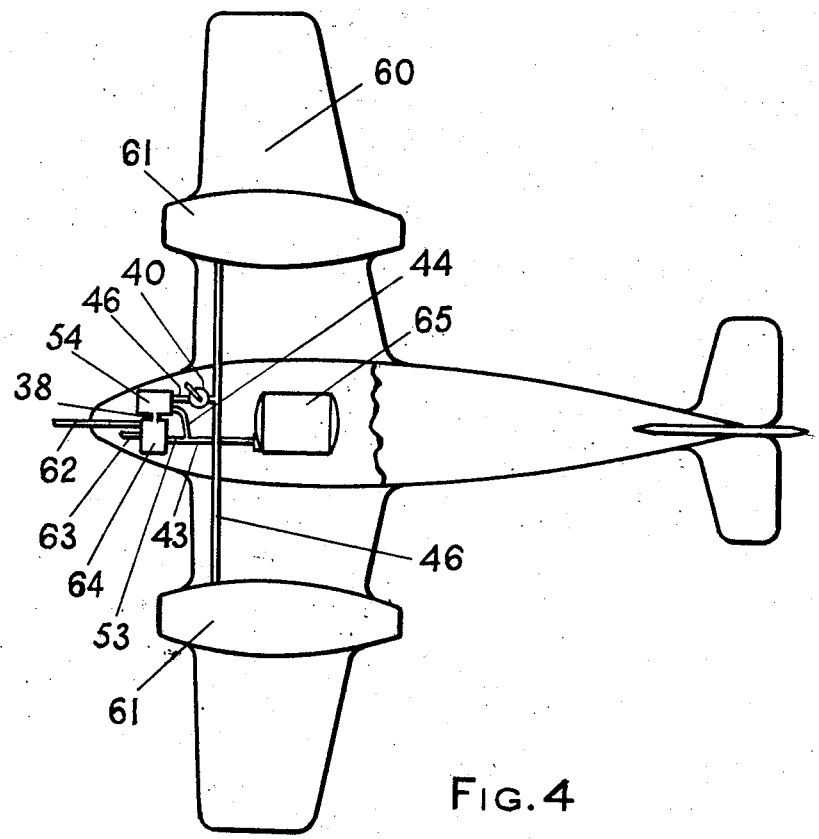
Fig. 4 is a diagrammatic plan view of an aircraft provided with the new control system.

The automatic control unit in accordance with this invention comprises a casing made in three parts 10, 11, 12, a part of the casing 11 which is shown in Figure 3 being shown in each of Figures 1 and 2.

Referring first to Figure 1, the casing 10 is divided into two chambers 14, 16, by a diaphragm 13, and chamber 14 is open at 15 to a Pitot-tube so that the pressure within the chamber 14 is determined by the tube. The chamber 16 is subject to the static ambient pressure of the atmosphere so that the diaphragm 13 is subject to the difference between the Pitot-pressure and the static pressure. A compression spring 17 is mounted in the chamber 16 and is operative on the diaphragm, the loading on the spring being adjusted so that the loading on the two sides of the diaphragm is balanced at the maximum safe indicated air-speed. The movements of the diaphragm under variations in the pressure-loading on it are transmitted to a lever 18 mounted on a flexible diaphragm 19 which serves as its fulcrum, the diaphragm also serving to isolate the interior of the chamber 16 from the casing 11. The other end 20 of the lever 18 lies within the casing 11 and in all conditions of flight at safe indicated air speeds, the end 20 of the lever rests on an abutment 21. Above the end 20 there is situated a member 32 which is adapted to be engaged and moved by the end 20 of the lever 18 when the latter is moved by its diaphragm 13. If $P_r$ is the Pitot-pressure existing in the chamber 14, $P_0$ is the static pressure in the chamber 16, $S_1$ the loading of the spring 17 and $A_1$ the effective area of the diaphragm, the diaphragm will be in balance when $P_r A_1 = P_0 A_1 + S_1$, or $(P_r - P_0) A_1 = S_1$.

If the conditions change so that $(P_r - P_0) A_1 > S_1$ the diaphragm will be moved to rock the lever 18, 20 so that the end 20 moves upwards. $(P_r - P_0)$ is proportional to the square of the indicated air-speed, and the load $S_1$ of the spring 17 is adjusted to correspond to the maximum safe indicated air-speed.

Figure 2 illustrates the device which is responsive to the Mach number. The casing 12 contains a diaphragm 22 dividing it into two chambers 23, 24 respectively of which the chamber 23 is subjected through a connection 25 to the Pitot-pressure, and the chamber 24 is subjected to the static pressure. Within the chamber 23 there is mounted an evacuated capsule 26 which is in compression between the diaphragm 22 and an adjustable abutment 27. On the under side of the diaphragm 22 there is mounted in the chamber 24 a compression spring 28 which is adjustable and acts on the diaphragm through a lever 29 similar to the lever 18.

The loading of the spring 28 is adjusted to balance the spring force of the capsule 26, so that the operative loadings on the diaphragm are only pressure-loadings. $A_2$ is the effective area of the diaphragm 22 and $A_3$ the effective area of the capsule 26 on the diaphragm, which can be expressed as the force exerted by the capsule 26 on the diaphragm 22 per unit Pitot pressure. If now $P_r$ and $P_0$ are the Pitot- and static pressures respectively then the loads on the diaphragm will be balanced when $$P_r(A_2 - A_3) = P_0 A_2$$

This expression can be put in the form $$P_r = \frac{P_0 A_2}{A_2 - A_3}$$

It is known that $$P_r = P_0 \left(1 + \frac{\gamma - 1}{2} m^2\right)^{\frac{\gamma}{\gamma-1}}$$

where $m$ is the Mach number and $\gamma$ is the ratio of the specific heats of air. Thus if the effective areas $A_2$ and $A_3$ are so selected that $$\frac{A_2}{A_2 - A_3} = \left(1 + \frac{\gamma-1}{2} m^2\right)^{\frac{\gamma}{\gamma-1}}$$

for a particular value of $m$, the diaphragm will be in balance when that value of the Mach number is attained, and if it be exceeded the diaphragm will be moved to rock the lever 29. This movement of the lever as hereinafter described will reduce or limit the power-output of the power-plant so as to limit the indicated air speed of the aircraft in powered level flight before it becomes so high that its control becomes difficult or the loads on it become excessive. This limitation of the indicated aircraft speed in accordance with the Mach number will normally occur at high altitude at which the aircraft has a high true air-speed.

The lever 29 above-mentioned is mounted in a flexible diaphragm 30 and its end 31 projects into the casing 11 so as to lie normally on the stop 21 (see also Fig. 1) adjacent the end 20 of the lever 18. Above the ends 31 and 20 there is situated the member 32 which is adapted to be engaged and moved by the end 31 of the lever 29 when the latter is moved by its diaphragm 22.

The member 32 as shown in Figure 3 is a lever which is pivoted at 33 and is pressed downwards by a spring 34 bearing against an adjustable abutment 35. The lever carries a hemispherical valve 36 which controls an outlet 37 from a pipe 38.

The fuel-supply to the power-plant of the aircraft is effected by a series of nozzles shown diagrammatically at 39, the supply to the nozzles being controlled by a throttle-valve 40, and the fuel is delivered under suitable pressure by a pump 54. In the particular example illustrated, the pump is a known type of swash-plate pump comprising a plurality of plungers 41 operated by a swash-plate 42 the angle of which is adjustable to vary the stroke of the plungers. The fuel is supplied by a pipe-line 43, 44, to the body of the pump at 45 and thence by separate passages to each of the plunger-cylinders, and is delivered therefrom by the pipe-line 46 to the throttle valve 40. The swash-plate 42 is automatically controlled by a ram 47. Fuel under pressure is delivered by the conduit 48 from the delivery pipe 46 to the left hand side of the ram 47, and is also supplied through a restricted orifice 49 to the right hand side of the ram. From the chamber on the right hand side of the ram, fuel is bled off through a conduit 50 under the control of a valve 51 in accordance with the engine-speed, the valve being controlled by a diaphragm $51^a$ that reacts to the engine-speed and is loaded by the spring $51^b$. A light spring 52 is also provided urging the ram 47 towards the left to give the maximum stroke to the plungers 41. For the purposes of the present invention the chamber on the right-hand side of the ram has a further connection from which fuel is bled off, this connection being the pipe 38 above referred to, and the amount of fuel bled off is controlled by the valve 36. Any fuel passing out from the pipe 38 by the outlet 37 under the control of the valve 36 enters the interior of the casing 11 and passes thence by the pipe-line 53 back to the inlet-side of the pump.

It will be seen that this arrangement provides therefore that when either of the levers 20 or 31 is moved by its diaphragm to rock the lever 32, the valve 36 is lifted so as to allow a greater discharge of fuel from the right-hand side of the ram 47 thereby reducing the pressure thereon, so that the ram 47 moves towards the right and reduces the strokes of all the plungers 41, resulting in a reduced fuel-delivery to the engine and a reduced power-output therefrom.

It will be seen, therefore, that this invention provides a simple unit for limiting the power-output of the aircraft when the conditions are such that it would be subject to excessive dynamic loadings or would be difficult to control if full power were used, whilst still allowing the use of the maximum power available in other conditions which do not lead to excessive loading or difficulty of control. The aircraft structure can therefore be designed to suit its normal operating conditions, and can be lighter, or alternatively, fitted with a propelling plant of higher power, than would otherwise be the case.

Referring now to Fig. 4, 60 is an aircraft having two gas-turbine jet propulsion engines 61, a Pitot tube 62, a tube 63 arranged to measure the static air pressure in any of the normal ways. 64 is the automatic control device composed of the device of either Fig. 1 or Fig. 2 or both and the device of Fig. 3. 65 is the fuel tank. The other designations correspond to those of Figs. 1, 2 and 3.

What we claim as our invention and desire to secure by Letters Patent is:

1. A control system for a high-speed aircraft having a jet-propulsion engine, for reducing the power developed by said engine when the aircraft attains a preselected Mach number, said control system comprising a fuel system for said engine including a variable-output pump of the type including a swashplate variation of whose angle causes variations in output of the pump, fuel injectors, conduit means between said fuel pump and said fuel injectors, a throttle valve in said conduit means by which the supply of fuel to the fuel injectors is normally controlled, a cylinder, a piston slidable in the cylinder, and connected to the swash-plate to vary its angle on sliding, passage means between said conduit upstream of said throttle valve and one end of the cylinder, a fluid vent at the other end of the cylinder, first resilient means to load said piston away from said other end of said cylinder, passage means between the two ends of said cylinder including a restricted orifice, a pivotally-mounted member, a valve carried by said pivotally-mounted member to control said fluid vent, second resilient means loading said pivotally-mounted member to close said fluid vent, a casing, a diaphragm dividing said casing into a first chamber and a second chamber, a Pitot tube which is mounted on the aircraft to be subjected to the Pitot pressure due to the velocity of the aircraft, conduit means connecting said first chamber and said Pitot tube, second conduit means connecting said second chamber to a point subjected to static pressure of the ambient atmosphere, a resilient evacuated capsule within said first chamber abutting said diaphragm and a wall of said chamber, whereby the diaphragm is loaded in the direction away from said first chamber due to the resilience of said capsule, third resilient means connected to said diaphragm to balance said load due to said capsule, and a pivotally-mounted lever connected to said diaphragm to be rocked by movement thereof, and connected to said pivotally-mounted member to rock it in the sense of opening said fluid vent on increase of pressure in said first chamber.

2. A control system for a high-speed aircraft having a jet propulsion engine, for reducing the power developed by said engine when the aircraft attains a preselected Mach number, said control system comprising a fuel supply system for said engine including a variable-delivery pump, conduit means between said pump and said engine, a throttle valve in said conduit means by which the supply of fuel to the engine is normally controlled, means including a pivotally-mounted member for varying the delivery of said pump independently of said throttle valve so arranged that rocking of said member varies the delivery of said pump, a casing, a diaphragm dividing said casing into a first chamber and a second chamber, a Pitot tube which is mounted on the aircraft to be subjected to the Pitot pressure due to the velocity of the aircraft, conduit means connecting said first chamber and said Pitot tube, second conduit means connecting said second chamber and a point subjected to static pressure of the ambient atmosphere, a resilient evacuated capsule within said first chamber abutting said diaphragm and a wall of said chamber whereby the diaphragm is loaded in the direction away from said first chamber due to the resilience of said capsule, and resilient means connected to said diaphragm to oppose said load due to said capsule; said pivotally-mounted member being connected to said diaphragm to be rocked by movement thereof.

3. In an aircraft having a Pitot static tube and a jet propulsion engine provided with a variable fuel delivery pump including a cylinder arranged in communication adjacent its opposing ends with the output side of the pump and a piston workably disposed in said cylinder and connected to the pump to vary the stroke thereof; means for limiting the power developed by the engine when the aircraft attains a preselected Mach number, said means including a relief conduit connected to one end of the cylinder, a normally closed valve in said conduit, a casing, a diaphragm mounted in the casing and dividing the casing into a first and a second chamber, said first chamber defining a Pitot pressure chamber and being connected to the Pitot tube, said second chamber defining a static pressure and being communicated with a point subjected to static pressure of the ambient atmosphere, means carried by the diaphragm engageable with the valve to open the valve upon movement of the diaphragm in reaction to a preselected value of the Mach number, a resilient evacuated capsule within the first chamber abutting said diaphragm and a wall of said casing, whereby the diaphragm is loaded in a direction away from said first chamber, and resilient means connected to said diaphragm to balance the load imposed by the capsule.

4. In an aircraft having a Pitot static tube and a jet propulsion engine provided with a variable fuel delivery pump including a cylinder arranged in communication adjacent its opposing ends with the output side of the pump and a piston workably disposed in said cylinder and connected to the pump to vary the delivery thereof; means for limiting the power developed by the engine when the aircraft attains a preselected Mach number, said means including a relief conduit connected to one end of the cylinder, a normally closed valve in said conduit, a casing, a diaphragm mounted in the casing and dividing the casing into a first and a second chamber, said first chamber defining a Pitot pressure chamber and being connected to the Pitot tube, said second chamber defining a static pressure and being communicated with a point subjected to static pressure of the ambient atmosphere, means carried by the diaphragm engageable with the valve to open the valve upon movement of the diaphragm in reaction to a preselected value of the Mach number, a resilient evacuated capsule within the first chamber abutting said diaphragm and a wall of said casing, whereby the diaphragm is loaded in a direction away from said first chamber, and resilient means connected to said diaphragm to balance the load imposed by the capsule.

5. In an aircraft having a jet propulsion engine including a fuel supply system, a control system for said fuel supply system comprising a Pitot tube mounted on said aircraft to be subjected to the Pitot pressure, and pressure-ratio-responsive means connected to said fuel supply system, to said Pitot tube and to a point on said aircraft subjected to the static pressure of the ambient atmosphere and responsive to the ratio of said Pitot pressure and said static pressure to reduce the flow of fuel supplied by said fuel supply system whenever said aircraft attains a selected Mach number irrespective of the individual values of said Pitot pressure and said static pressure.

FREDERICK WILLIAM PAGE.
    STANLEY GEORGE HOOKER.

References Cited in the file of this patent

UNITED STATES PATENTS

| Number | Name | Date |
|---|---|---|
| 1,418,131 | Curtiss | May 30, 1922 |
| 1,978,863 | Gregg et al. | Oct. 30, 1934 |
| 2,160,194 | Bates | May 30, 1939 |
| 2,272,664 | Gropler | Feb. 10, 1942 |
| 2,391,896 | Hanson | Jan. 1, 1946 |
| 2,450,535 | Watson | Oct. 5, 1948 |

FOREIGN PATENTS

| Number | Country | Date |
|---|---|---|
| 274,082 | Great Britain | July 26, 1928 |